United States Patent
Ohta et al.

(10) Patent No.: US 7,095,396 B2
(45) Date of Patent: Aug. 22, 2006

(54) LIQUID CRYSTAL DISPLAY DEVICE USING OCB CELL AND DRIVING METHOD THEREOF

(75) Inventors: Yoshihito Ohta, Okayama (JP); Katsuyuki Arimoto, Okayama (JP); Takahiro Kobayashi, Okayama (JP); Taro Funamoto, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 205 days.

(21) Appl. No.: 10/088,329

(22) PCT Filed: Jul. 9, 2001

(86) PCT No.: PCT/JP01/05949

§ 371 (c)(1),
(2), (4) Date: Mar. 13, 2002

(87) PCT Pub. No.: WO02/06885

PCT Pub. Date: Jan. 24, 2002

(65) Prior Publication Data

US 2002/0149549 A1    Oct. 17, 2002

(30) Foreign Application Priority Data

Jul. 14, 2000    (JP)    ............................. 2000-214827

(51) Int. Cl.
*G09G 3/36*    (2006.01)

(52) U.S. Cl. ........................... 345/94; 345/89; 345/690
(58) Field of Classification Search ............ 345/87–89, 345/94, 690, 95, 99, 204, 691; 349/33, 75, 349/76, 123, 120
See application file for complete search history.

(56) References Cited

U.S. PATENT DOCUMENTS 5,627,560 A    5/1997    Verhulst (Continued)

FOREIGN PATENT DOCUMENTS

EP    1 107 223 A2    6/2001

(Continued)

*Primary Examiner*—Sumati Lefkowitz
*Assistant Examiner*—Ke Xiao
(74) *Attorney, Agent, or Firm*—Hamre, Schumann, Mueller & Larson, P.C.

(57) ABSTRACT

A liquid crystal display device capable of suppressing the occurrence of a back transition in OCB cells and displaying excellent images as well as a driving method thereof are provided. One frame period has a first period P1 for writing a signal for initializing the state of a liquid crystal in pixel cells and a second period for writing pixel data in correspondence with an image signal in pixel cells, and a voltage level to be applied to each pixel cell is set in the first period such that each pixel cell retains a voltage Vsup higher than that in the second period.

3 Claims, 17 Drawing Sheets

U.S. PATENT DOCUMENTS

| | | | |
|---|---|---|---|
| 5,751,267 A * | 5/1998 | Sato et al. | 345/96 |
| 5,892,494 A * | 4/1999 | Kimura et al. | 345/96 |
| 6,069,604 A | 5/2000 | Verhulst | |
| 6,069,620 A | 5/2000 | Nakamura et al. | |
| 6,084,562 A * | 7/2000 | Onda | 345/94 |
| 6,094,184 A * | 7/2000 | Okamoto | 345/89 |
| 6,166,714 A * | 12/2000 | Kishimoto | 345/96 |
| 6,256,006 B1 * | 7/2001 | Yamamoto et al. | 345/101 |
| 6,268,839 B1 * | 7/2001 | Yang et al. | 345/89 |
| 6,396,469 B1 | 5/2002 | Miwa et al. | |
| 6,456,266 B1 * | 9/2002 | Iba et al. | 345/87 |
| 6,486,864 B1 * | 11/2002 | Nakajima et al. | 345/92 |
| 6,501,455 B1 * | 12/2002 | Nakamura | 345/96 |
| 2005/0024309 A1 | 2/2005 | Yamazaki et al. | |

FOREIGN PATENT DOCUMENTS

| | | |
|---|---|---|
| JP | 61-128227 | 6/1986 |
| JP | 9-90909 | 4/1997 |
| JP | 9-138421 | 5/1997 |
| JP | 9-325715 | 12/1997 |
| JP | 11-109921 | 4/1999 |
| JP | 3074640 | 6/2000 |
| JP | 2000-321556 | 11/2000 |
| JP | 2000-347634 | 12/2000 |

* cited by examiner

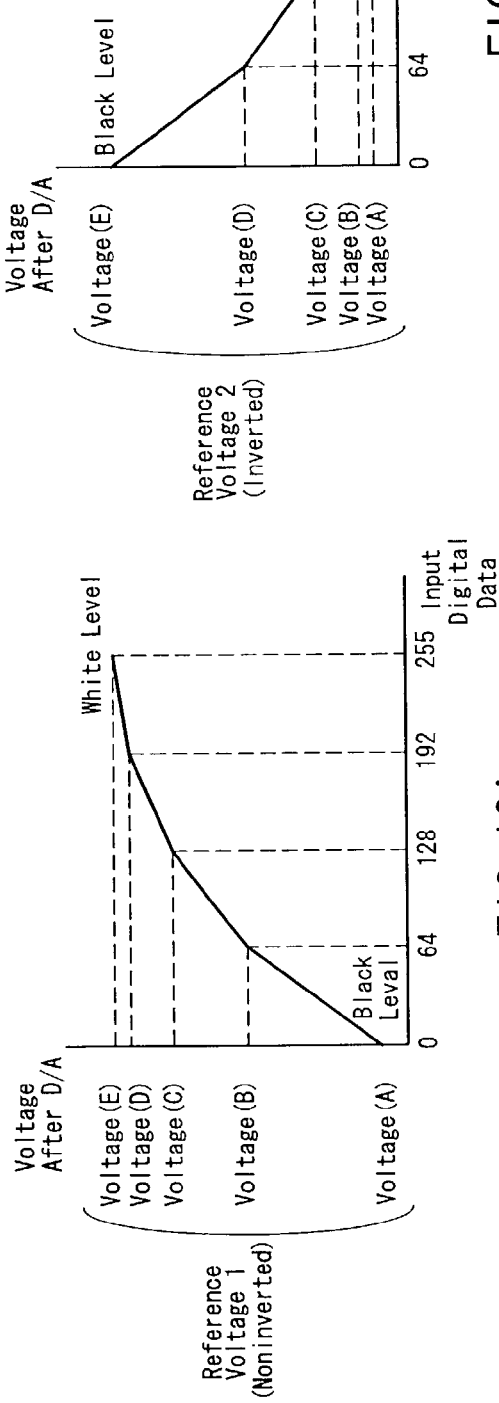
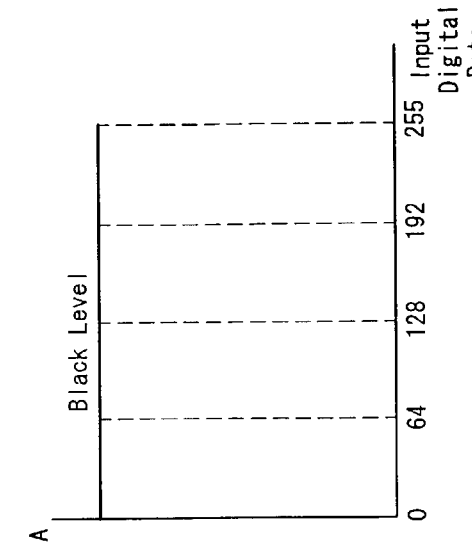
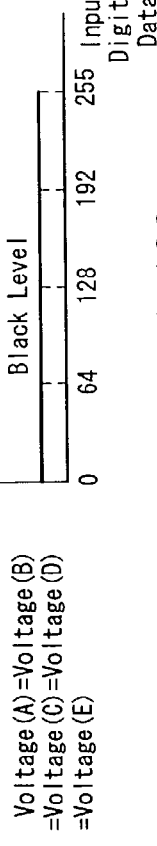
FIG. 12A
FIG. 12B
FIG. 12C
FIG. 12D

LIQUID CRYSTAL DISPLAY DEVICE USING OCB CELL AND DRIVING METHOD THEREOF

TECHNICAL FIELD

The present invention relates to a method of driving an active matrix liquid crystal display device and a liquid crystal display device, and particularly to a method of driving a liquid crystal display device using an OCB (optically compensated birefringence) liquid crystal mode which realizes a wide view-field angle and high-speed response and a liquid crystal display device.

BACKGROUND ART

As is widely known, a liquid crystal display device is used in large numbers as a visual display device of a computer or the like and is expected to be used more widely also for use in television in future. However, a TN type cell that at present is widely used has serious problems with its display performance when used as television, for example, a narrow view-field angle, an insufficient response speed, deterioration in parallactic contrast, and blurring of moving images.

In recent years, studies on an OCB cell that is to be used instead of such a TN type cell have been made. The OCB cell is characterized by having a wide view-field angle and a high-speed response compared to the TN type cell, so that the OCB cell can be regarded as a liquid crystal cell that is more suitable for displaying natural moving images.

In the following, a conventional method of driving a liquid crystal display device and a liquid crystal display device will be described.

FIG. 14 is a block diagram showing the configuration of a conventional liquid crystal display device.

In FIG. 14, X1, X2, ..., Xn are gate lines, Y1, Y2, ..., Ym are source lines, 126 is a thin-film transistor (hereinafter referred to as a TFT) as a switching element, and a drain electrode of each TFT is connected to a pixel electrode inside a pixel 106. Each pixel 106 includes a pixel electrode, an common electrode that is a transparent electrode and a liquid crystal interposed between these two electrodes. The common electrode is driven by a voltage (Vcom) supplied from an common driving part 105. The voltage Vcom supplied to the common electrode has two kinds of voltages, including a first reference voltage Vref1 and a second reference voltage Vref2, and the voltage is supplied while switching between them for each horizontal period.

103 is an IC (hereinafter referred to as a source driver) that outputs a voltage to Y1, Y2, ..., Ym to be supplied to the pixel 106. 104 is a gate driver for applying a voltage rendering the TFT 126 to be in an ON state or a voltage rendering the TFT 126 to be in an OFF state. The gate driver 104 applies an ON voltage sequentially to the gate lines X1, X2, ..., Xn in synchronization with the supply of data to the source lines Y1, Y2, ..., Ym by the source driver 103. A phase of the voltage supplied from the source driver 103 is opposite relative to a phase of the voltage Vcom supplied to the common electrode. This difference in voltage between the voltage Vcom supplied to the common electrode and the voltage applied to each pixel 106 via the source lines Y1, Y2, ..., Ym is a voltage that is applied to both ends of the liquid crystal inside the pixel 106, and this voltage determines the transmittance of the pixel 106.

In addition, FIG. 15 is a diagram showing waveforms of the voltage Vcom supplied to the common electrode, a source signal Vs serving as an image signal (VI) supplied to the source driver 103, gate signals Vg(n−1), Vg (n), Vg (n+1) applied to (n−1) line, n line, (n+1) line respectively and the timing relationship thereof.

Such a driving method is the same when using the OCB cell as well as when using the TN-type cell. However, the OCB cell needs to be driven in a special manner at an operation stage of starting an image display, which is not required for the TN type cell.

As shown in FIG. 16, an OCB cell has bend configuration (white display) corresponding to a state capable of an image display (FIG. 16B), bend configuration (black display) (FIG. 16C) and splay configuration corresponding to a state incapable of displaying (FIG. 16A). In order to shift the configuration from this splay configuration state to a bend configuration state (hereinafter referred to as a transition), special driving needs to be done such as application of a high voltage for a fixed period of time. However, the driving concerning this transition is not directly related to the present invention, so that it will not be further explained.

However, the problem with this OCB cell was that even if transition to bend configuration is once effected by the aforementioned special driving, when a condition continues to proceed in which a voltage of a predetermined level or higher is not applied for longer than a fixed period of time, the OCB cell cannot maintain the bend configuration and thus returns to the splay configuration (hereinafter, this phenomenon is referred to as a back transition).

DISCLOSURE OF THE INVENTION

Therefore, it is an object of the present invention to provide a method of driving a liquid crystal display device that can suppress an occurrence of a back transition and can display excellent images using an OCB cell and a liquid crystal display device.

To achieve the aforementioned object, a driving method of a liquid crystal display device according to the present invention is a method for driving a liquid crystal display device having a liquid crystal panel that includes a plurality of source lines to which pixel data are supplied, a plurality of gate lines to which scanning signals are supplied, pixel cells positioned in matrix form in correspondence with intersecting points of the source lines and the gate lines, a source driver that drives the source lines based on an input image signal, a gate driver that drives the gate lines, and a back light, and the pixel cells are OCB cells. The driving method is characterized in that a first period for writing a signal for initializing a state of a liquid crystal in the pixel cells and a second period for writing pixel data in correspondence with the image signal in the pixel cells are provided selectively in one frame period, and a voltage level to be applied to each pixel cell in the first period is set such that each pixel cell retains a voltage Vsup higher than that in the second period. Here, "a signal for initializing a state of a liquid crystal" refers to a signal to be written in the liquid crystal for rendering the OCB liquid crystal that tries to return to the splay state more likely to remain in the bend state.

In the driving method according to the present invention, it is preferable that a ratio occupied by the first period in one frame period is set to be less than 20%.

Furthermore, it is preferable that when a voltage of a predetermined level or lower is applied to the pixel cell, it is judged that the first period needs to be set in a next frame, and the first period is set in the next frame.

In addition, it is preferable that when a voltage of a predetermined level or lower is applied to the same pixel cell continuously in a predetermined number of preceding frames including a current frame, it is judged that the first period needs to be set in a next frame, and the first period is set in the next frame.

Moreover, it is preferable that the voltage Vsup is set variably for each frame.

In this case, it is preferable that when it is judged that the first period needs to be set, a voltage Vsup to be applied in a next frame is set to be at a level not less than a voltage Vsup applied in an immediately preceding frame, while when it is judged that the first period does not need to be set, a voltage Vsup to be applied in a next frame is set to be of a level not more than a voltage Vsup applied in an immediately preceding frame.

Alternatively, it is preferable that a length of the first period is set variably for each frame.

In this case, it is preferable that when it is judged that the first period needs to be set, a first period to be set in a next frame is set to be not less than a length of a first period set in an immediately preceding frame, while when it is judged that the first period does not need to be set, a first period to be set in a next frame is set to be not more than a length of a first period set in an immediately preceding frame.

Furthermore, it is preferable that the back light is controlled by using back light luminance control means that controls the brightness of the back light such that the back light lights up brighter in the frame in which the first period is set than in the frame in which the first period is not set.

Furthermore, it is preferable that the back light is controlled by using back light luminance control means that controls the brightness of the back light such that the back light lights up bright in correspondence with a length of the first period.

Furthermore, it is preferable that a length of the first period is controlled by a result of calculating an average luminance level by an image signal input in a predetermined number of preceding frames and an average luminance level by an image signal to be input in a current frame.

In this case, it is preferable that when a difference between an average luminance level by an image signal input in a predetermined number of preceding frames and an average luminance level by an image signal to be input in a current frame is larger than a predetermined level, the first period is set to a predetermined length in a next frame.

Moreover, in the driving method according to the present invention, it is preferable that it is detected whether an input image signal is a moving image or a static image, and as a result of detection, the first period is set longer than a predetermined length when it is judged that the input image signal is a moving image, and the first period is set shorter than a predetermined length when it is judged that the input image signal is a static image.

Moreover, in the driving method according to the present invention, it is preferable that when the image signal as a digital signal is converted to an analog signal inside the source driver, a reference voltage used for conversion is switched in synchronization with a driving timing of the source line and the gate line.

Moreover, in the driving method according to the present invention, it is preferable that the pixel data are supplied to the source lines in not more than half a time that can be spent for scanning one scanning line in one frame.

Alternatively, it is preferable that a voltage corresponding to pixel data for one screen is applied to each pixel cell for not more than half a time of one frame period.

To achieve the aforementioned object, a liquid crystal display device according to the present invention is a liquid crystal display device having a liquid crystal panel that includes a plurality of source lines to which pixel data are supplied, a plurality of gate lines to which scanning signals are supplied, pixel cells positioned in matrix form in correspondence with intersecting points of the source lines and the gate lines, a source driver that drives the source lines based on an input image signal, a gate driver that drives the gate lines, and a back light, and the pixel cells are OCB cells. The liquid crystal display device is characterized in that a first period for writing a signal for initializing a state of a liquid crystal in the pixel cells and a second period for writing pixel data in correspondence with the image signal in the pixel cells are provided selectively in one frame period, and means for setting a voltage level to be applied to each pixel cell in the first period such that each pixel cell retains a voltage Vsup higher than that in the second period (driving control part) is provided.

In the liquid crystal display device according to the present invention, it is preferable that the setting means (the driving control part) sets the voltage Vsup variably for each frame.

Alternatively, it is preferable that the setting means (the driving control part) sets a length of the first period variably for each frame.

Furthermore, it is preferable that the liquid crystal display device according to the present invention further includes back light luminance control means (back light control part) for controlling the brightness of the back light, wherein the back light luminance control means controls the back light such that the back light lights up bright in correspondence with a length of the first period.

According to the aforementioned method and the configuration, it is possible to suppress an occurrence of a back transition and to easily set the shortest Vsup hold period and the minimum Vsup voltage capable of suppressing a back transition. Therefore, it becomes possible to display excellent images by reducing the effects of the deterioration in display luminance as much as possible by inserting the Vsup hold period.

BRIEF DESCRIPTION OF THE DRAWINGS

FIG. 12A is a diagram showing input-output characteristics of a source driver shown in FIG. 11 resulting from switching to a reference voltage VREF1.

FIG. 12B is a diagram showing input-output characteristics of a source driver shown in FIG. 11 resulting from switching to a reference voltage VREF2.

FIG. 12C is a diagram showing input-output characteristics of a source driver shown in FIG. 11 resulting from switching to a reference voltage VREF3.

FIG. 12D is a diagram showing input-output characteristics of a source driver shown in FIG. 11 resulting from switching to a reference voltage VREF4.

BEST MODE FOR CARRYING OUT THE INVENTION

In the following, preferable embodiments of the present invention will be described with reference to the drawings.

Embodiment 1

Figure 1:
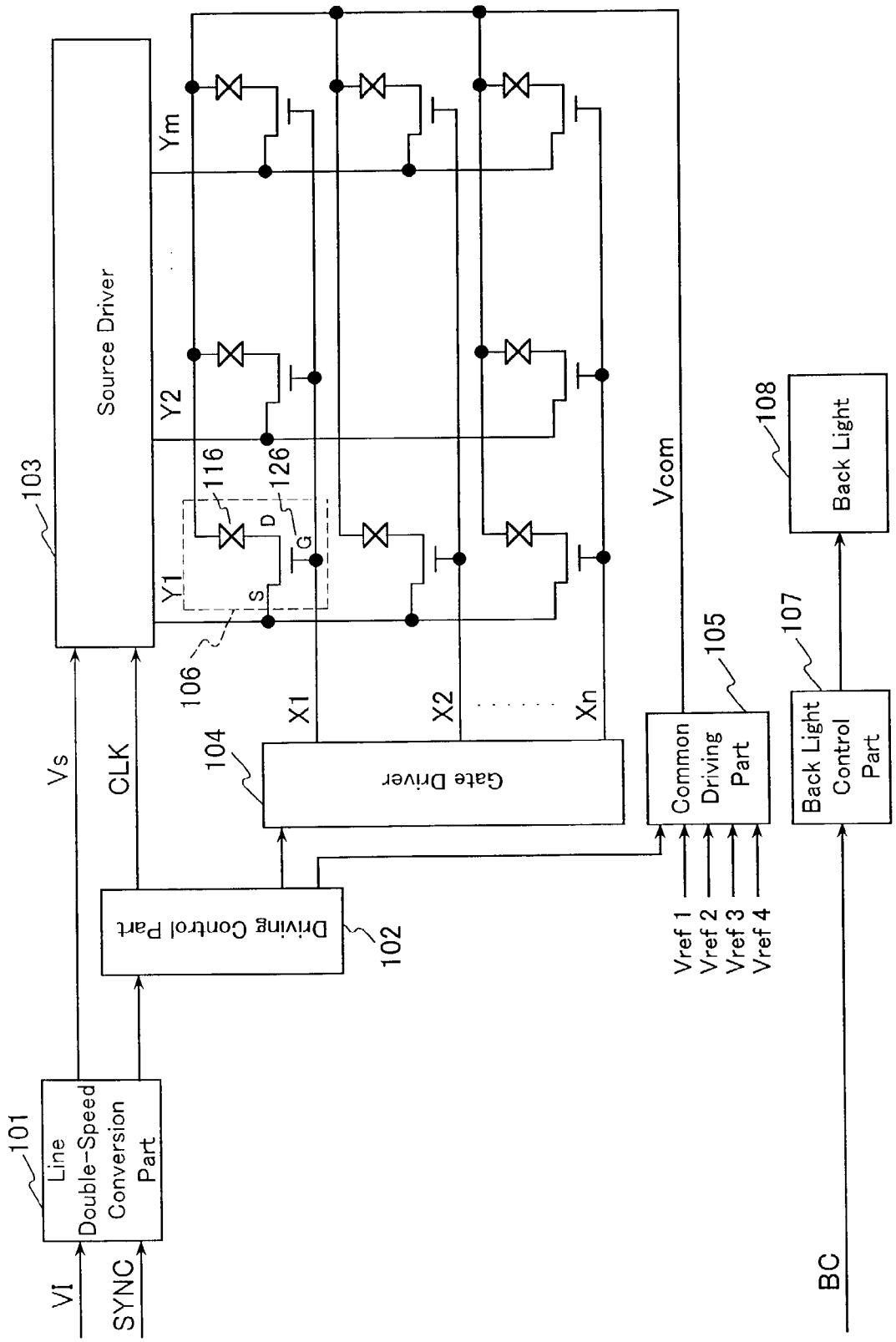
FIG. 1 is a block diagram showing the configuration of a liquid crystal display device according to Embodiment 1 of the present invention.

FIG. 1 is a block diagram showing the configuration of a liquid crystal display device according to Embodiment 1 of the present invention. In FIG. 1, the liquid crystal display device includes a line double-speed conversion part 101 to which an image signal (VI) and a synchronous signal (SYNC) are input, a driving control part 102, a source driver 103, a gate driver 104, an common driving part 105 to which first to fourth reference voltages Vref1 to Vref4 are input and from which an common voltage Vcom is output, a pixel cell 106, a back light control part 107 to which a back light luminance control signal (BC) is input, and a back light 108. Furthermore, the pixel cell 106 includes a liquid crystal 116 and a switching element (TFT) 126.

In the following, a method of driving a liquid crystal display device according to Embodiment 1 of the present invention will be described by referring further to FIG. 2.

Figure 2:
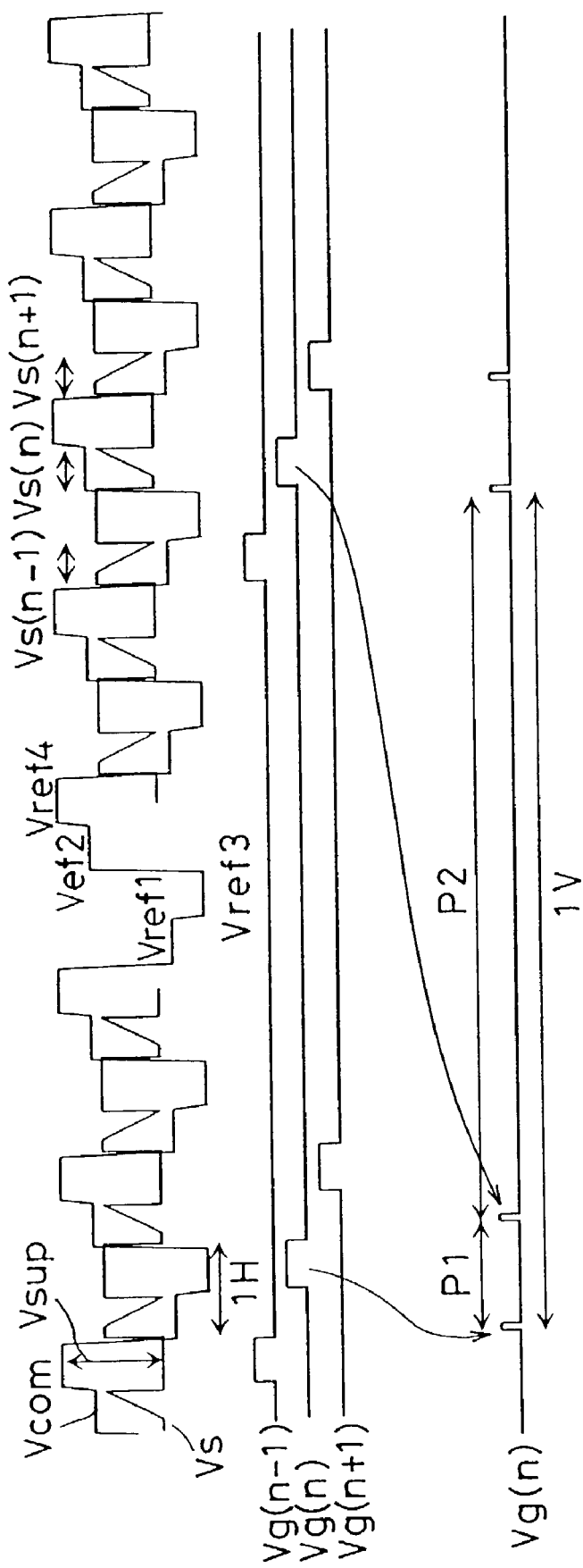
FIG. 2 is a timing chart for an common voltage Vcom, a source signal Vs and a gate signal Vg for driving the liquid crystal display device shown in FIG. 1 with respect to a given input image signal.

FIG. 2 is a timing chart for an common voltage Vcom, a source signal Vs and a gate signal Vg for driving the liquid crystal display device shown in FIG. 1 with respect to a given input image signal.

In FIG. 2, the common voltage Vcom is provided from a drain electrode (D) of the TFT 126 formed on a cell to an common electrode wired commonly via a liquid crystal cell, the source signal Vs is supplied from the line double-speed conversion part 101 to the source driver 103, and a sample-and-hold voltage of the Vs with a clock CLK supplied from the driving control circuit 102 is supplied to a source electrode (S) of the TFT 126 through the source lines Y1 to Ym.

Usually, a voltage drop called feedthrough occurs between source and drain, which generally is corrected on the Vcom side, but the explanation thereof will be omitted for the purpose of simplification.

Gate signals Vg(n−1), Vg(n), Vg(n+1) respectively are supplied to gate lines Xn−1, Xn, Xn+1, and schematically, it is sufficient for these signals to have 2 values of an ON voltage and an OFF voltage.

First, the image signal VI is converted to a double frequency in the line double-speed conversion part 101 based on the synchronous signal SYNC, and this line double-speed image signal is sent to the source driver 103 as the source signal Vs. However, in the present embodiment, instead of sending a double frequency image signal twice, as shown in FIG. 2, a signal for initializing the state of the liquid crystal (hereinafter referred to as an initialization signal, and in the case of an OCB cell, for example, a black signal of a high level), which is a signal written in the liquid crystal for rendering the OCB liquid crystal that tries to return to the splay state more likely to remain in the bend state, is interposed between the double frequency image signals, such as in the order of a double frequency image signal, an initialization signal, a double frequency image signal, an initialization signal and so on. A voltage supplied to the liquid crystal cell is a voltage difference between the common voltage Vcom and the source voltage Vs at a time of gate ON, and an absolute value of this voltage difference affects the transmittance of the liquid crystal and the effects of the back transition prevention.

The source signal Vs supplied to each cell is driven in a half cycle of one horizontal period (1H) such as an image signal, an initialization signal, an image signal, an initialization signal and so on, and a gate electrode (G) of the TFT 126 is scanned separately by the gate signal, as shown in FIG. 2, with respect to a timing of switching ON at the time of an initialization signal and a timing of switching ON at the time of an image signal. Thus, it is driven as if initialization signals and image signals are scanned individually.

Therefore, when attention is focused on each cell, it becomes clear that one frame period (1V) is divided into a back transition prevention driving period P1 (a first period) and an image signal driving period P2 (a second period).

As already described above, it is possible to prevent a back transition phenomenon of returning to splay configuration by providing an initialization signal voltage to the cell for a fixed period of time, but the luminance also is deteriorated by writing initialization signals, so that it is preferable to set this back transition prevention driving period P1 for writing initialization signals to be as short as possible.

Generally, a liquid crystal cell in normally white mode has an increased response speed to black when driven by a high voltage. Therefore, when the reference voltage to be supplied to the common electrode is changed from the conventional 2 kinds to 4 kinds, and when the liquid crystal cell is driven so as to write the Vsup voltage that is a voltage with a higher absolute value of (Vcom–Vs) when writing initialization signals, rather than when writing image signals, the Vsup hold period serving as the back transition prevention driving period P1 can be shortened even more.

As described above, according to the present embodiment, it becomes possible to adjust the Vsup hold period to an arbitrary length by switching 4 kinds of the reference voltages Vref1, Vref2, Vref3, Vref4 provided to the common driving part 105 and driving the common electrode in synchronization with driving of the source line and the gate line. As a result, a shortest Vsup hold period capable of suppressing a back transition can be set easily, and the effects of the screen luminance deterioration through insertion of a Vsup hold period can be reduced as much as possible.

In the experiments conducted by the present inventors, it was confirmed that a back transition phenomenon can be suppressed when a ratio occupied by the aforementioned Vsup hold period in one frame period of an input signal is less than 20%.

Embodiment 2

In Embodiment 1 mentioned above, the Vsup hold period was inserted equally for all the frames. However, a back transition occurs only when a condition continues in which a voltage of a predetermined level or higher is not applied for longer than a fixed period of time. Therefore, Embodiment 2 of the present invention is configured such that it is judged whether a signal of a predetermined level or higher is included in an input signal, and that, only when a signal of a predetermined level or higher is included, a Vsup hold period is set.

Figure 17:
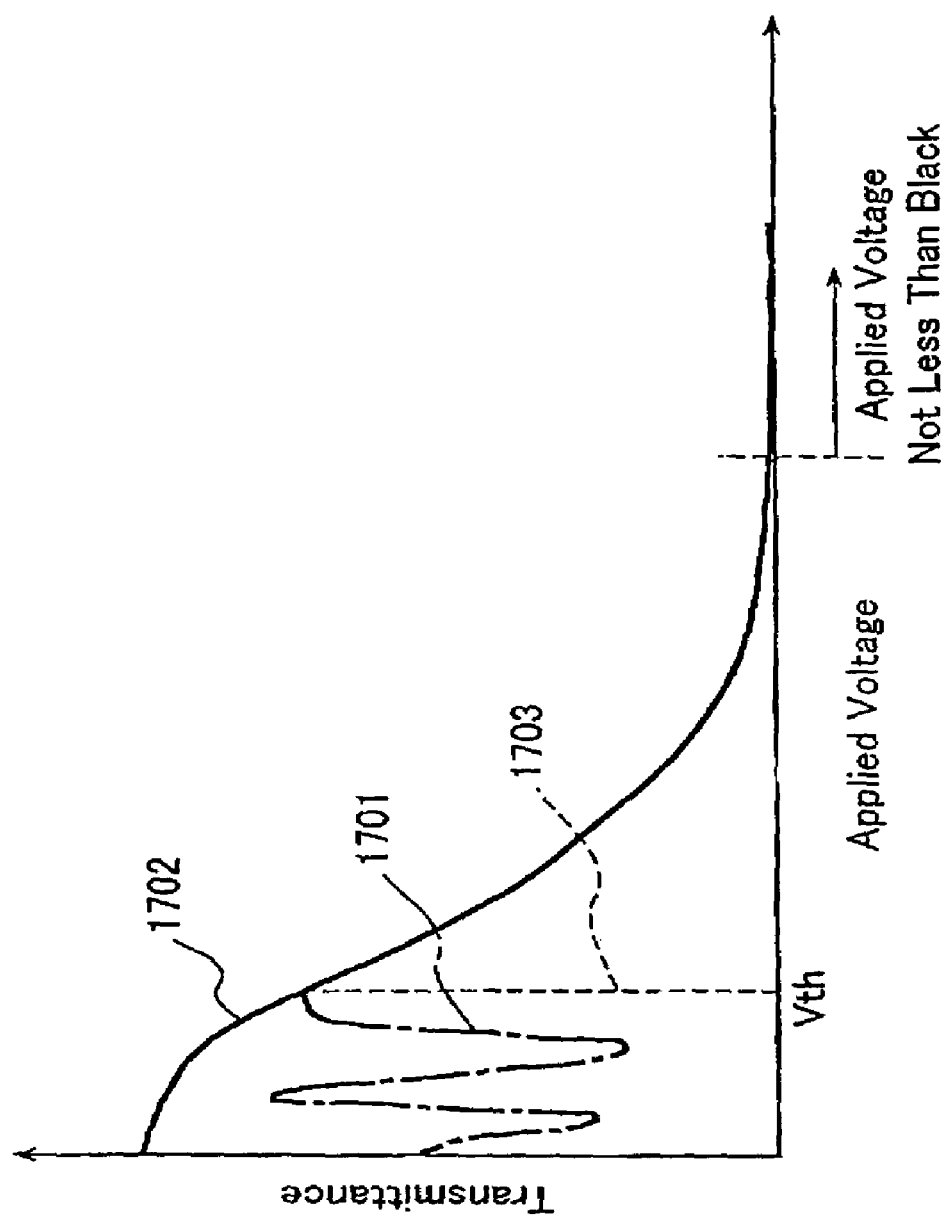
FIG. 17 is a graph showing an applied voltage-transmittance curve of a general OCB cell.

Here, the expression "an input signal of a predetermined level or higher" will be explained. FIG. 17 is a graph showing an applied voltage-transmittance curve of a general OCB cell. In FIG. 17, 1701 shows an applied voltage-transmittance curve in a case where a predetermined voltage for prevention of a back transition is not inserted, 1702 shows an applied voltage-transmittance curve in a case where a predetermined voltage for prevention of a back transition is inserted, and 1703 shows a critical voltage Vth at which a back transition from bend configuration to splay configuration occurs when prevention of a back transition is not carried out. When the prevention of a back transition is not carried out, it is returned to splay configuration at not more than Vth, so that an appropriate transmittance can not be obtained, and thus, the OCB cell must be driven at a voltage of not less than Vth, but in this case, a sufficient luminance cannot be obtained. In addition, as shown in FIG. 17, in the case of an OCB cell, its transmittance is reduced as an applied voltage becomes greater, while its transmittance is increased as an applied voltage becomes smaller. In other words, as the level of a displayed image signal becomes higher, a voltage applied to a pixel is reduced. Therefore, the expression "an input signal of a predetermined level or higher" is equivalent to the expression "a voltage applied to a pixel cell is of a predetermined level or lower". This explanation also is applicable to the embodiments to be described later.

Figure 3:
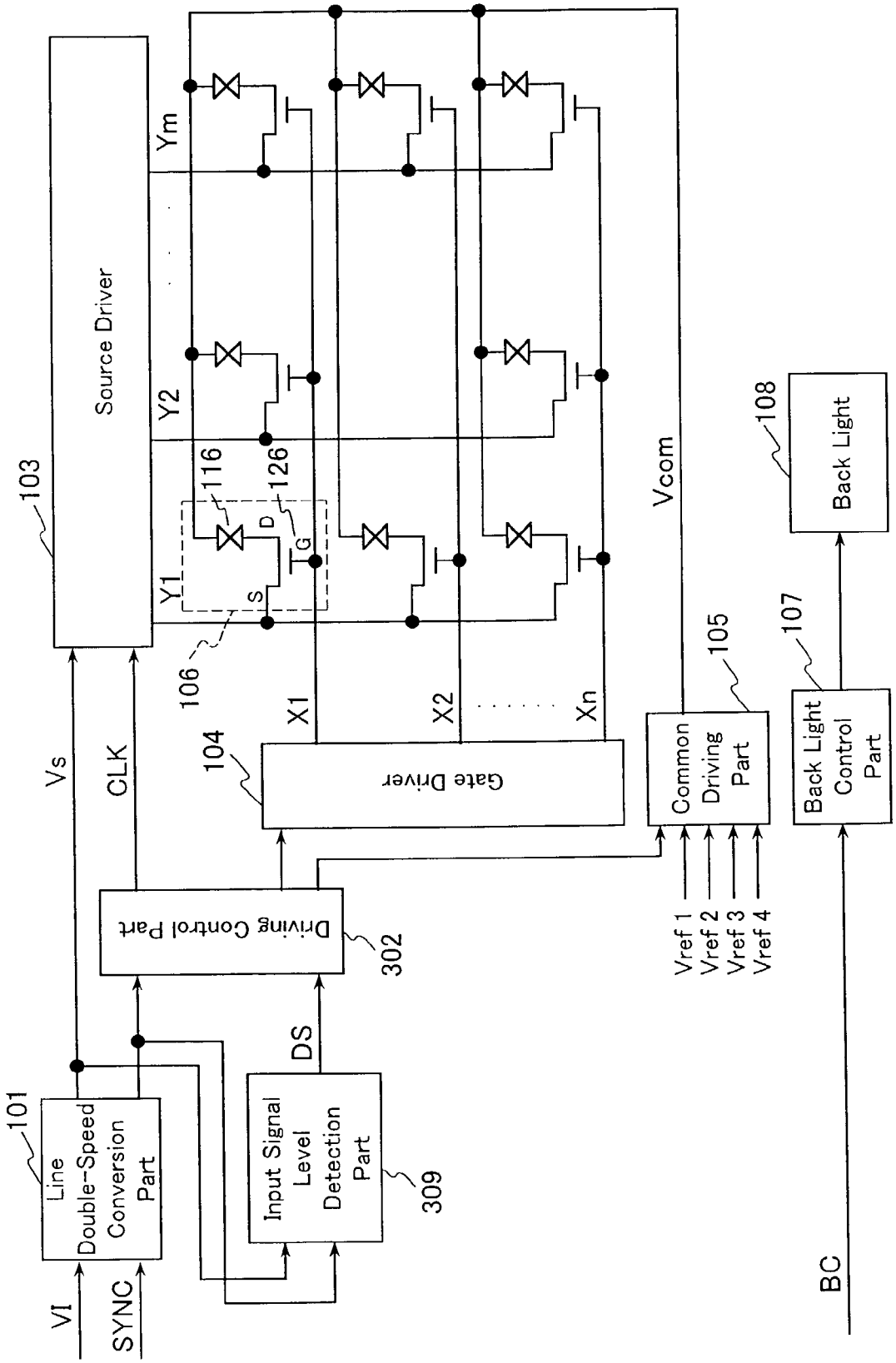
FIG. 3 is a block diagram showing the configuration of a liquid crystal display device according to Embodiment 2 of the present invention.

FIG. 3 is a block diagram showing the configuration of a liquid crystal display device according to Embodiment 2 of the present invention. In FIG. 3, the liquid crystal display device includes a line double-speed conversion part 101, an input signal level detection part 309, a driving control part 302, a source driver 103, a gate driver 104, an common driving part 105, a pixel cell 106, a back light control part 107 and a back light 108.

As is shown in FIG. 3, the liquid crystal display device according to Embodiment 2 is constructed such that the driving control part 102 in the liquid crystal display device according to Embodiment 1 mentioned above is replaced by the driving control part 302, and that the input signal level detection part 309 is further added. In addition, the configuration of the liquid crystal display device according to Embodiment 2 other than the above-mentioned elements is the same as that of the liquid crystal display device according to Embodiment 1 mentioned above, and the corresponding components have been given the same reference numerals and the explanations thereof are omitted.

In the following, a method of driving a liquid crystal display device according to Embodiment 2 of the present invention will be described by referring further to FIG. 4.

Figure 4:
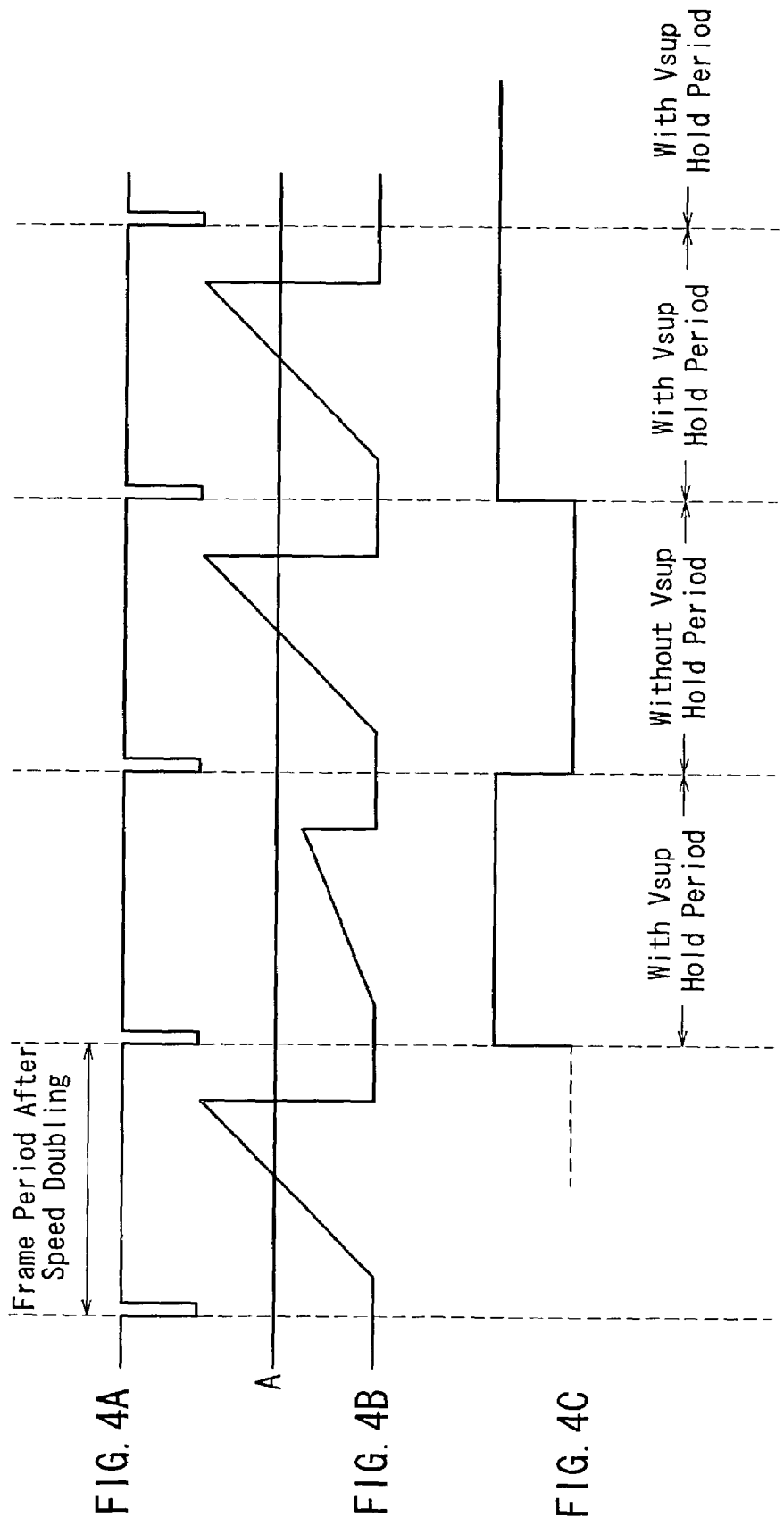
FIG. 4A is a timing chart for a vertical synchronous signal after double-speed conversion is performed for driving the liquid crystal display device shown in FIG. 3 with respect to a given input image signal.
FIG. 4B is a timing chart for an image signal (Vs) after double-speed conversion is performed for driving the liquid crystal display device shown in FIG. 3 with respect to a given input image signal.
FIG. 4C is a timing chart for a signal level detection signal (DS) for driving the liquid crystal display device shown in FIG. 3 with respect to a given input image signal.

FIG. 4 is a timing chart of a control signal for driving the liquid crystal display device shown in FIG. 3 with respect to a given input image signal.

FIG. 4A shows a vertical synchronous signal indicating a frame cycle after double-speed conversion performed by the line double-speed conversion part 101; FIG. 4B shows an image signal (Vs) after double-speed conversion performed in a like manner; and FIG. 4C shows a signal level detection signal (DS) generated by the input signal level detection part 309 in correspondence with a predetermined detection level (A).

The input signal level detection part 309 judges in a frame unit whether a signal of the predetermined level A or higher is included in the input image signal Vs and outputs the signal level detection signal DS. The driving control part 302 receives this signal level detection signal DS, and when a signal of the predetermined level A or higher is included in the input image signal, generates a driving control signal for setting a Vsup hold period in the next frame. Hereinafter, the same processing as in Embodiment 1 will be performed.

As described above, according to the present embodiment, it is judged in a frame unit whether a signal of a predetermined level or higher is included in an input image signal, and when a signal of a predetermined level or higher is included in the input signal, a Vsup hold period is set in the next frame. According to this configuration, it becomes possible to eliminate an unnecessary Vsup hold period and to suppress the deterioration in the average luminance of a display screen caused by setting a Vsup hold period.

Embodiment 3

In Embodiment 2 mentioned above, controlling of whether a Vsup hold period is to be set or not was performed in correspondence with the level of an input image signal. At this time, the average luminance of a display screen changes between frames in which a Vsup hold period is set and a Vsup hold period is not set. Therefore, Embodiment 3 of the present invention is configured to reduce this sense of visual incongruity caused by the change in luminance.

Figure 5:
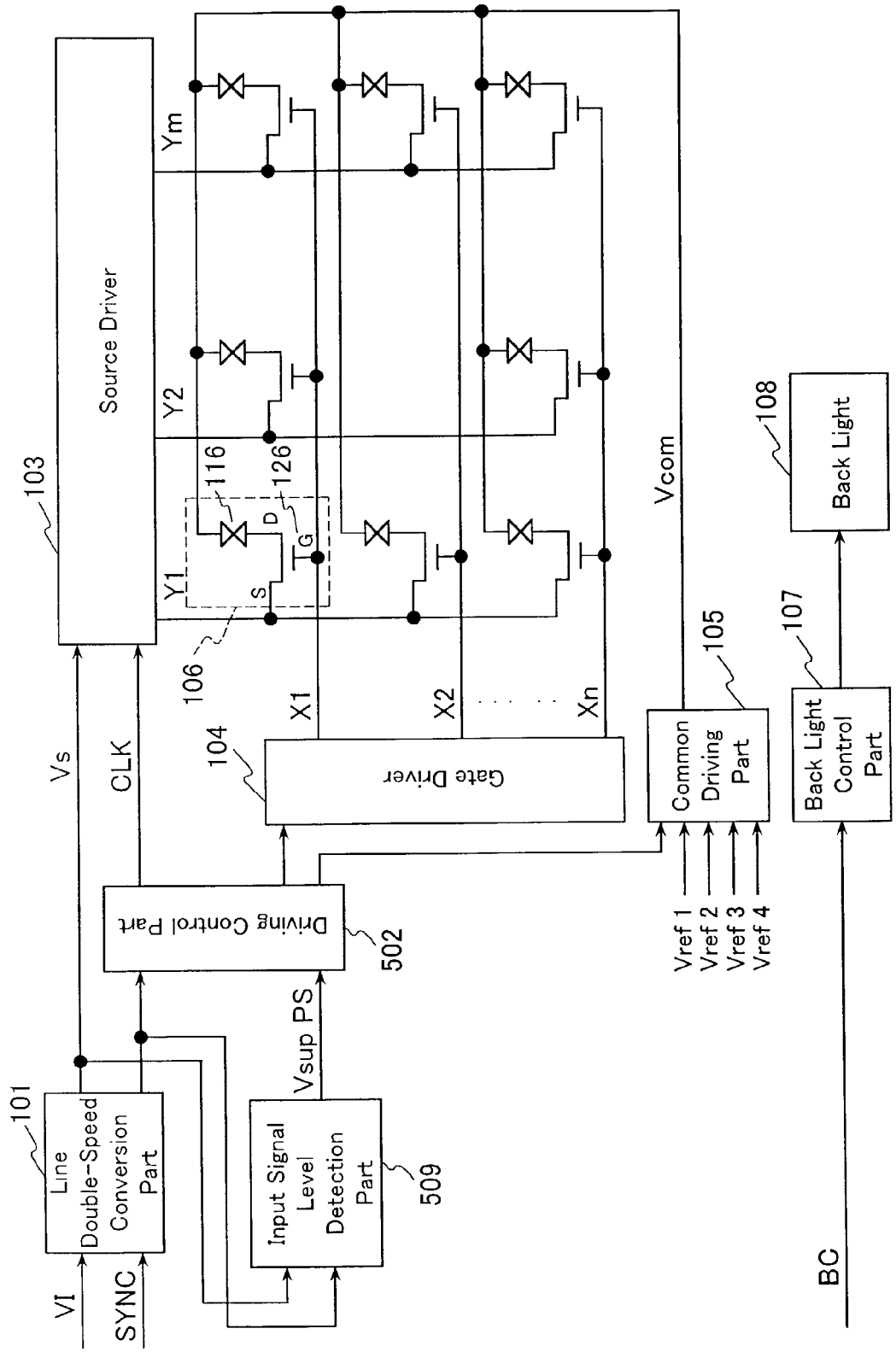
FIG. 5 is a block diagram showing the configuration of a liquid crystal display device according to Embodiment 3 of the present invention

FIG. 5 is a block diagram showing the configuration of a liquid crystal display device according to Embodiment 3 of the present invention. In FIG. 5, the liquid crystal display device includes a line double-speed conversion part 101, an input signal level detection part 509, a driving control part 502, a source driver 103, a gate driver 104, an common driving part 105, a pixel cell 106, a back light control part 107 and a back light 108.

As is shown in FIG. 5, the liquid crystal display device according to Embodiment 3 is constructed such that the driving control part 302 in the liquid crystal display device according to Embodiment 2 mentioned above is replaced by the driving control part 502, and that the input signal level detection part 309 is replaced by the input signal level detection part 509. In addition, the configuration of the liquid crystal display device according to Embodiment 3 other than the above-mentioned elements is the same as that of the liquid crystal display device according to Embodiment 2 mentioned above, and the corresponding components have been given the same reference numerals and the explanations thereof are omitted.

In the following, a driving method of a liquid crystal display device according to Embodiment 3 of the present invention will be described by referring further to FIG. 6.

Figure 6:
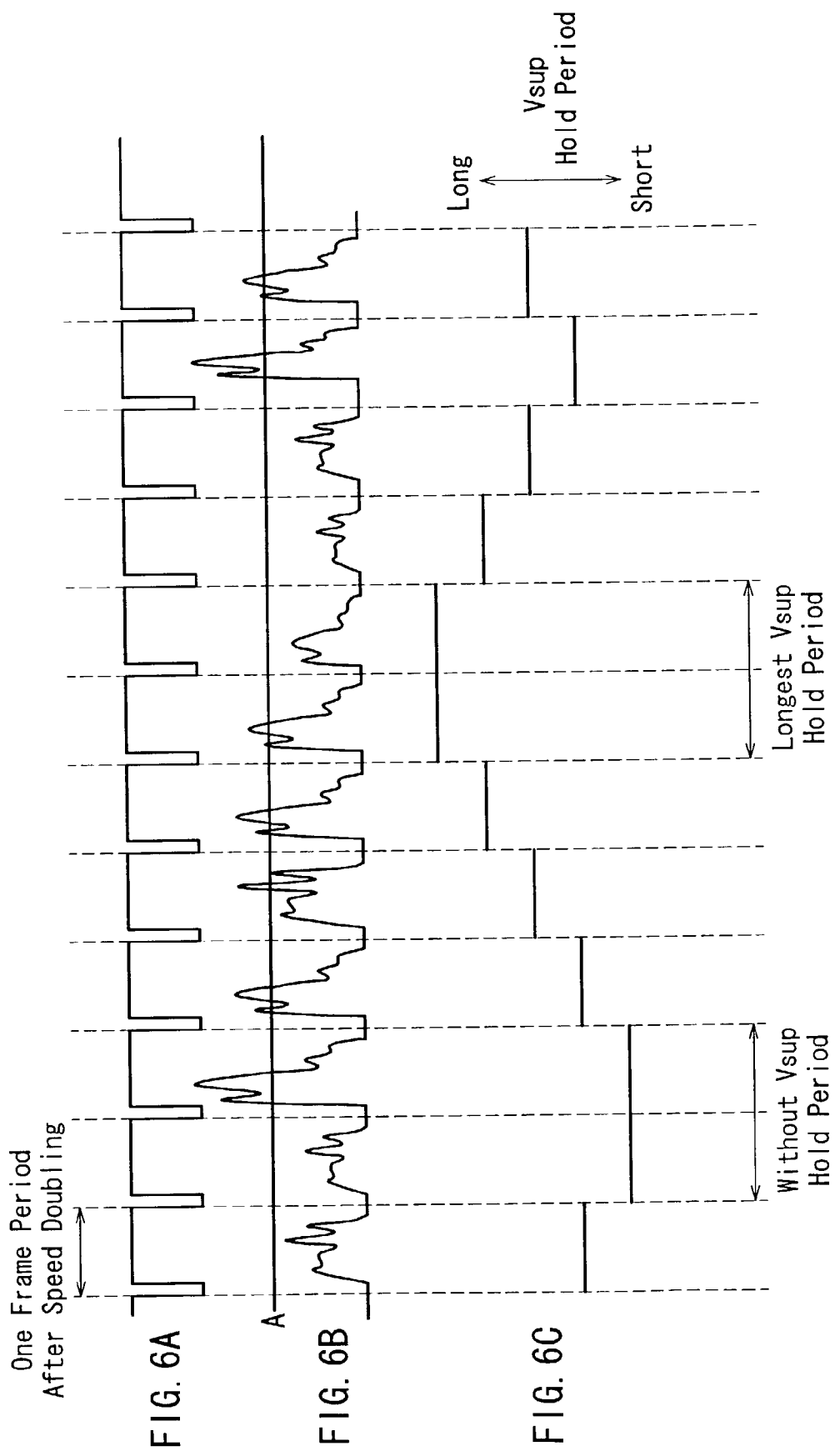
FIG. 6A is a timing chart for a vertical synchronous signal after double-speed conversion is performed for driving the liquid crystal display device shown in FIG. 5 with respect to a given input image signal.
FIG. 6B is a timing chart for an image signal (Vs) after double-speed conversion is performed for driving the liquid crystal display device shown in FIG. 5 with respect to a given input image signal.
FIG. 6C is a timing chart for a Vsup period provision signal (VsupPS) for driving the liquid crystal display device shown in FIG. 5 with respect to a given input image signal.

FIG. 6 is a timing chart of a control signal for driving the liquid crystal display device with respect to a given input image signal.

FIG. 6A shows a vertical synchronous signal indicating a frame cycle after double-speed conversion performed by the line double-speed conversion part 101; FIG. 6B shows an image signal (Vs) after double-speed conversion performed in a like manner; and FIG. 6C shows a Vsup period provision signal generated by the input signal level detection part 509 in correspondence with a predetermined detection level A.

The input signal level detection part 509 judges in a frame unit whether a signal of the predetermined level A or higher is included in the input image signal Vs and outputs the Vsup period provision signal (Vsup PS). The Vsup period provision signal VsupPS is a signal that defines the length of a Vsup period in that particular frame. In FIG. 6, this signal is shown as having a switching precision of 5 stages in length.

When a signal of the predetermined level A or higher is included in the input image signal of the current frame, the input signal level detection part 509 generates a Vsup period provision signal VsupPS that sets the length of a Vsup period in the next frame to be longer by 1 stage at most than the length of a Vsup period in the current frame. Furthermore, when a signal of the predetermined level or higher is not included in the input image signal of the current frame, the input signal level detection part 509 generates a Vsup period provision signal VsupPS that sets the length of a Vsup period in the next frame to be shorter by 1 stage at most.

The driving control part 502 receives this Vsup period provision signal VsupPS and generates a control signal so that a Vsup period in correspondence with this value is set.

As described above, according to the present embodiment, it is judged in frame unit whether a signal of a predetermined level or higher is included in an input image signal, and the length of a Vsup period is changed continuously between frames based on this result of judgement. According to this configuration, it becomes possible to eliminate unnecessary Vsup hold periods, while suppressing the change in average luminance of a display screen caused by the change in the Vsup period between the frames, and the deterioration in the average luminance of a display screen caused by setting a Vsup hold period can be suppressed.

In addition, FIG. 6C shows that the Vsup period provision signal Vsup PS can be selected at 5 stages, but if more gradation is given, a change in luminance caused by the difference in length of the Vsup period between the frames can be suppressed to that extent, so that it is preferable. Moreover, the relationship between the gradation of the Vsup period provision signal VsupPS and the actual length of the Vsup period corresponding thereto may be linear, or a nonlinear type that is determined depending on the gradation of the Vsup period provision signal Vsup PS in the current frame.

Embodiment 4

In Embodiment 3 mentioned above, controlling of changing the length of a Vsup hold period between frames was performed continuously in correspondence with the level of an input image signal. At this time, along with the change in length of the Vsup hold period, an average luminance of a display screen changes while admitting that it is a continuous change. Embodiment 4 of the present invention is configured to suppress this change in luminance.

Figure 7:
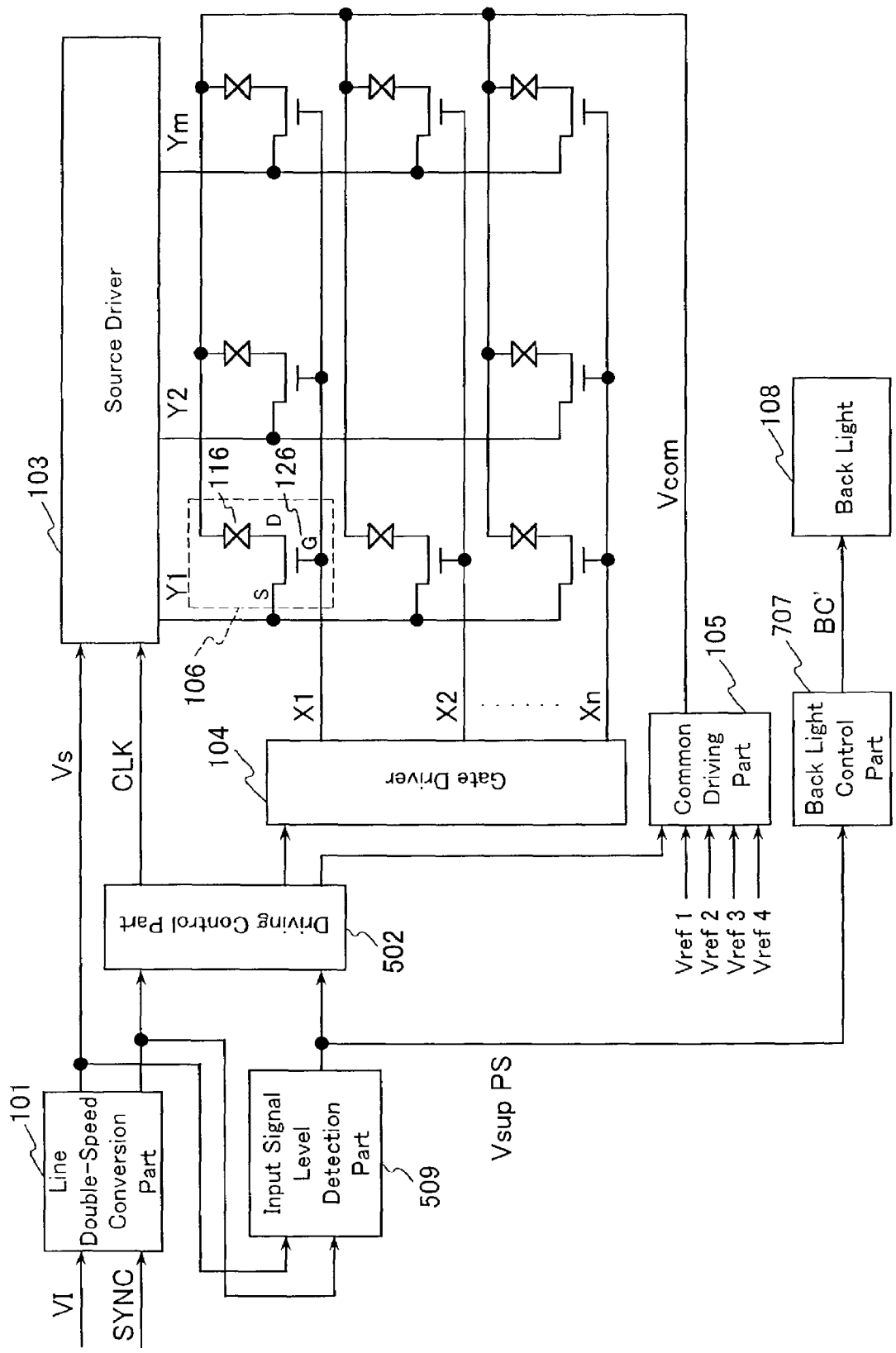
FIG. 7 is a block diagram showing the configuration of a liquid crystal display device according to Embodiment 4 of the present invention.

FIG. 7 is a block diagram showing the configuration of a liquid crystal display device according to Embodiment 4 of the present invention. In FIG. 7, the liquid crystal display device includes a line double-speed conversion part 101, an input signal level detection part 509, a driving control part 502, a source driver 103, a gate driver 104, an common driving part 105, a pixel cell 106, a back light control part 707, and a back light 108.

As is shown in FIG. 7, the liquid crystal display device according to Embodiment 4 is constructed such that the back light control part 707 is newly added to the liquid crystal display device according to Embodiment 3 mentioned above. In addition, the configuration of the liquid crystal display device according to Embodiment 4 other than the above-mentioned element is the same as that of the liquid crystal display device according to Embodiment 3 mentioned above, and the corresponding components have been given the same reference numerals and the explanations thereof are omitted. Moreover, a method for controlling a back light luminance is a process performed conventionally, so that a detailed explanation thereof is omitted here.

In the following, a driving method of a liquid crystal display device according to Embodiment 4 of the present invention will be described by referring further to FIG. 8.

Figure 8:
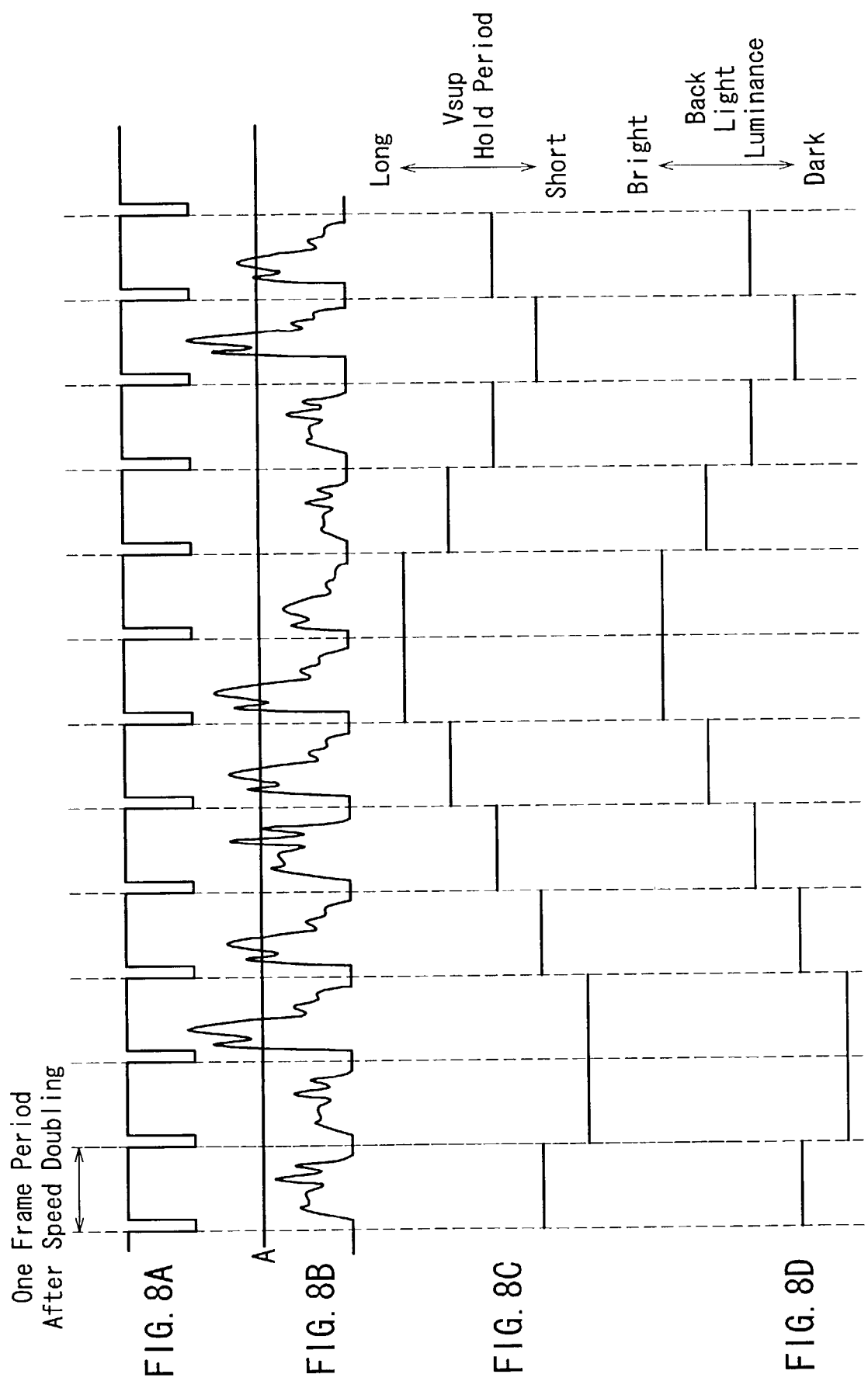
FIG. 8A is a timing chart for a vertical synchronous signal after double-speed conversion is performed for driving the liquid crystal display device shown in FIG. 7 with respect to a given input image signal.
FIG. 8B is a timing chart for an image signal (Vs) after double-speed conversion is performed for driving the liquid crystal display device shown in FIG. 7 with respect to a given input image signal.
FIG. 8C is a timing chart for a Vsup period provision signal (VsupPS) for driving the liquid crystal display device shown in FIG. 7 with respect to a given input image signal.
FIG. 8D is a timing chart for a back light luminance control signal BC' for driving the liquid crystal display device shown in FIG. 7 with respect to a given input image signal.

FIG. 8 is a timing chart of a control signal for driving the liquid crystal display device with respect to a given input image signal.

A vertical synchronous signal indicating a frame cycle after double-speed conversion performed by the line double-speed conversion part 101, an image signal (Vs) after double-speed conversion performed in a like manner and a Vsup period provision signal VsupPS generated by the input signal level detection part 509 in correspondence with a predetermined detection level A shown respectively in FIG. 8A, FIG. 8B and FIG. 8C are all identical to the signals in Embodiment 3.

As shown in FIG. 8D, the back light control part 707 receives the Vsup period provision signal VsupPS from the input signal level detection part 509 and generates a back light luminance control signal BC' for lighting the back light 108 with a luminosity that compensates for a change in average luminance of a display screen caused by a change in the Vsup period determined by the Vsup period provision signal VsupPS.

As is clear from FIG. 8, the back light luminance control signal BC' is determined in correspondence with the Vsup period provision signal VsupPS and controls the back light 108 such that the back light luminance becomes brighter when the Vsup period is long, that is, the average luminance of the display screen is reduced, and to the contrary, the back light luminance becomes darker when the Vsup period is short, that is, the average luminance of the display screen is raised.

As described above, according to the present embodiment, the length of a Vsup period and the brightness of a back light are controlled in conjunction with each other, so that it becomes possible to suppress a change in the average luminance of a display screen caused by the presence or absence of a Vsup period, while maintaining the suppression effects of a back transition.

Embodiment 5

As already described, a back transition occurs when a condition continues in which a voltage of a predetermined level or higher is not applied to a certain pixel for longer than a fixed period of time, and controlling of setting a Vsup hold period when a signal of a predetermined level A or higher is included in one frame of an input image signal as performed in Embodiments 2 to 4 satisfies sufficient conditions for suppressing a back transition. Embodiment 5 of the present invention is configured to conduct a more detailed determination of the frames that require setting of a Vsup period.

Figure 9:
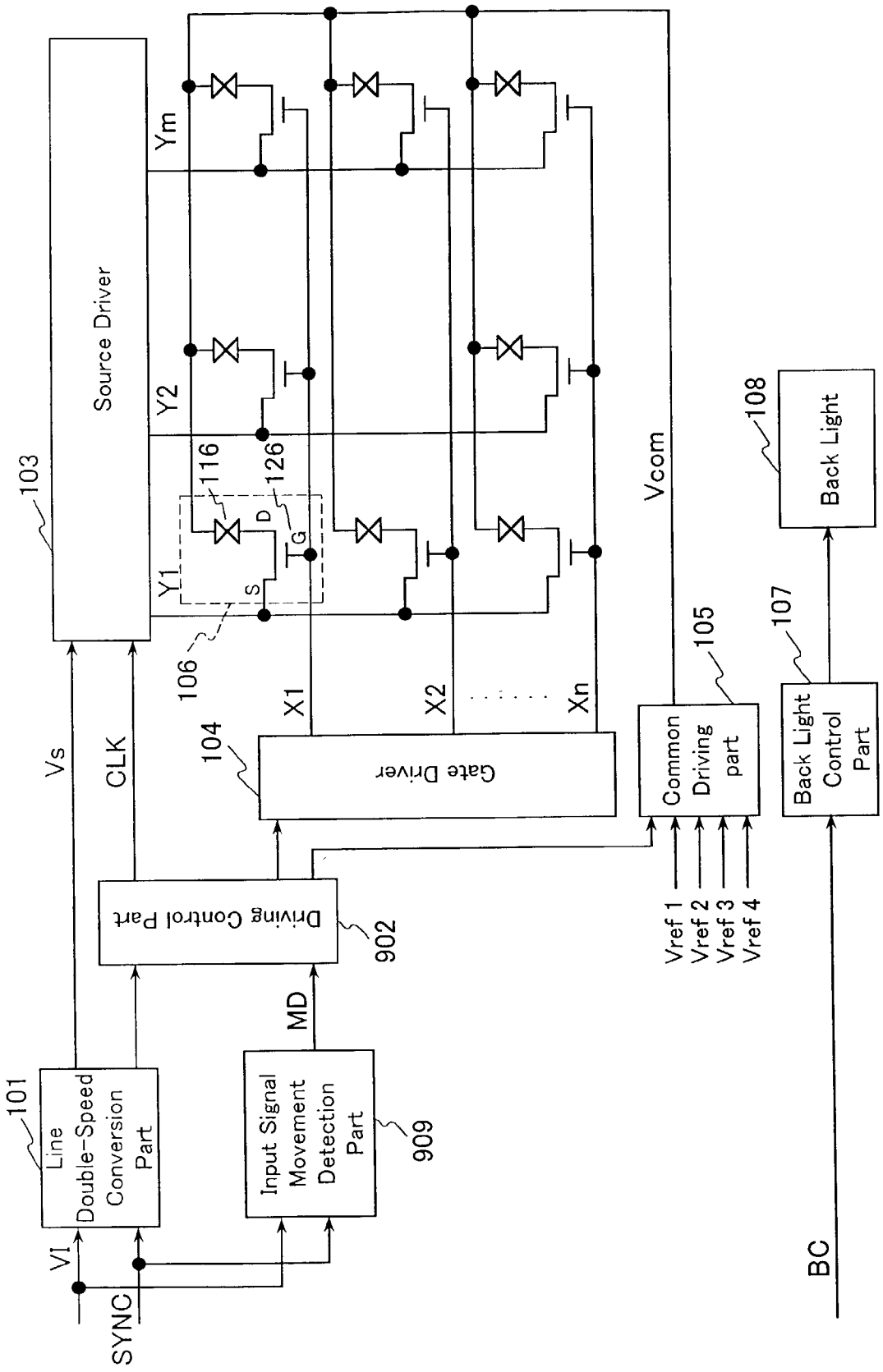
FIG. 9 is a block diagram showing the configuration of a liquid crystal display device according to Embodiment 5 of the present invention.

FIG. 9 is a block diagram showing the configuration of a liquid crystal display device according to Embodiment 5 of the present invention. In FIG. 9, the liquid crystal display device includes a line double-speed conversion part 101, a driving control part 902, a source driver 103, a gate driver 104, an common driving part 105, a pixel cell 106, a back light control part 107, a back light 108 and an input signal movement detection part 909.

As is shown in FIG. 9, the liquid crystal display device according to Embodiment 5 is constructed such that the driving control part 502 in the liquid crystal display device according to Embodiment 3 mentioned above is replaced by the driving control part 902, and that the input signal movement detection part 909 is newly added. In addition, the configuration of the liquid crystal display device according to Embodiment 5 other than the above-mentioned elements is the same as that of the liquid crystal display device according to Embodiment 2 mentioned above, and the corresponding components have been given the same reference numerals and the explanation thereof is omitted.

The input signal movement detection part 909 receives an image signal (VI) and a synchronous signal (SYNC) to be input to the liquid crystal display device and judges whether the input image signal is a moving image or a static image. The input signal movement detection part 909 has a memory capable of retaining an image signal for one frame, compares an image signal in the immediately preceding frame with the current input image signal written in each pixel, and judges in consideration also of the effects of noise included in the image signal that a pixel having this difference of a predetermined level or lower is a pixel without movement with respect to the preceding frame (hereinafter referred to as a static pixel). When a number of this static pixel is not more than a predetermined number, the input image signal is judged as a moving image. However, when there is a static pixel of a predetermined level or lower in a number of not less than a predetermined number, the input image signal is judged as a static image. The input signal movement detection part 909 outputs the above-mentioned result of judgement as a movement detection signal (MD) to the driving control part 902. The driving control part 902 sets a Vsup period only when the input image signal is judged as a static image by the input signal movement detection part 909 based on the movement detection signal MD.

As described above, according to the present embodiment, when there is a large number of pixels in which a difference between the image signal retained in the immediately preceding frame and the image signal in the current frame is of a predetermined level or lower, the input image is judged as a static image and a Vsup period is set. On the other hand, as for frames in which no possibility of a back transition exists, a Vsup period is not set. Thus, unnecessary deterioration in the average luminance of a display screen can be suppressed.

In addition, the present embodiment was described in that a Vsup period is set only when the input image signal is judged as a static image by the input signal movement detection part 909. However, it may be controlled so as to elongate the Vsup period when it is judged as a static image and to shorten the Vsup period when it is judged as a moving image. Alternatively, it may be controlled so as to raise the voltage of Vsup when it is judged as a static image and to lower the voltage of Vsup when it is judged as a moving image. Furthermore, the judgement on whether it is a static image or a moving image was made by using only data in one frame, but this judgement may be made by using data in a plurality of frames.

Moreover, an image signal and a synchronous signal that were input to the liquid crystal display device were used as an input for the input signal movement detection part 909, but a line double-speed image signal (Vs) and a synchronous signal output from the line double-speed conversion part 101 may be used.

Embodiment 6

It has become clear from the evaluations made by the present inventors that the suppression effects of a back transition are high when the Vsup period is elongated although the average luminance of a display screen is deteriorated. Therefore, Embodiment 6 of the present invention is configured to perform controlling by setting a comparatively long Vsup period based on the judgement that even if the Vsup period is elongated at the boundary of frames where the characteristics of an input image are changed greatly compared to frames before and after thereof, the visual effects resulting from a change in average luminance thereby are small.

Figure 10:
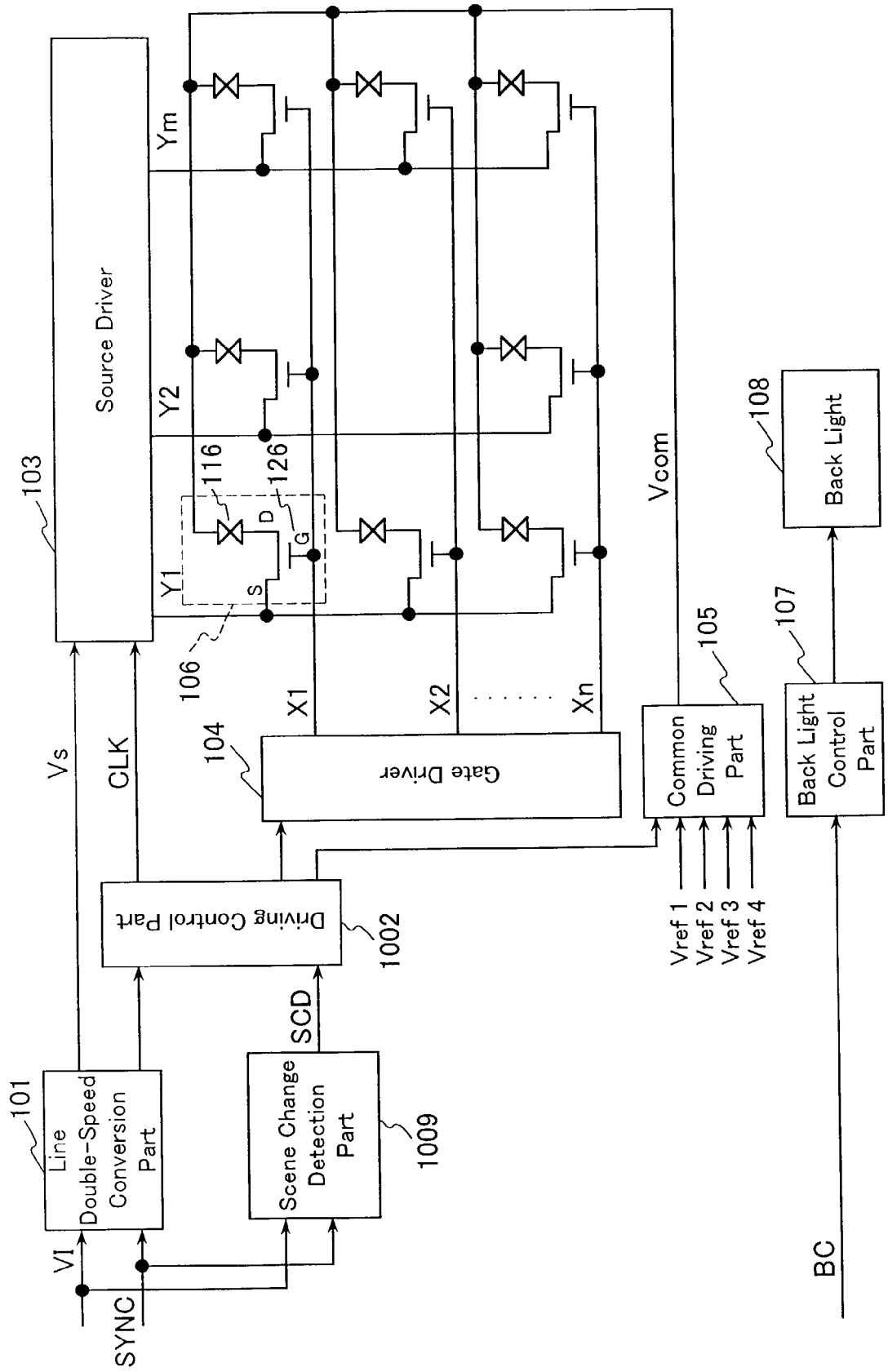
FIG. 10 is a block diagram showing the configuration of a liquid crystal display device according to Embodiment 6 of the present invention.

FIG. 10 is a block diagram showing the configuration of a liquid crystal display device according to Embodiment 6 of the present invention. In FIG. 10, the liquid crystal display device includes a line double-speed conversion part 101, a driving control part 1002, a source driver 103, a gate driver 104, an common driving part 105, a pixel cell 106, a back light control part 107, a back light 108 and a scene change detection part 1009.

As is shown in FIG. 10, the liquid crystal display device according to Embodiment 6 is constructed such that the driving control part 502 in the liquid crystal display device according to Embodiment 3 mentioned above is replaced by the driving control part 1002, and that the scene change detection part 1009 is newly added. In addition, the configuration of the liquid crystal display device according to Embodiment 6 other than the above-mentioned elements is the same as that of the liquid crystal display device according to Embodiment 2 mentioned above, and the corresponding components have been given the same reference numerals and the explanation thereof is omitted.

The scene change detection part 1009 is a part for detecting a change in the characteristics of an input image signal when the change is great. In the experiments conducted by the present inventors, it was confirmed that detection precision can be obtained to some degree by the following comparatively simple configuration.

In other words, detection is performed by focusing attention on the average luminance level of display data in each frame (hereinafter referred to as an APL). The detection of an APL is a process performed conventionally, so that a detailed explanation thereof is omitted here. The scene change detection part 1009 receives an image signal that is input to the present liquid crystal display device to retain an APL in the immediately preceding frame (hereinafter referred to as an APLpre) and to calculate an APL in this frame at the end of one frame (hereinafter referred to as an APLnow). Then, when the absolute value of the difference between the APLpre and the APLnow is of a predetermined level or higher, it is judged that the characteristics of the image have changed greatly.

When it is judged that the characteristics of the image have changed greatly, the scene change detection part 1009 renders a scene change detection signal (SCD) to be in an active state during the next one frame. In the frame in which the scene change detection signal SCD is in the active state, the driving control part 1002 sets the Vsup hold period to be longer by a predetermined time than other frames.

As described above, according to the present embodiment, by setting the Vsup period to become longer at the boundary of the frames where the characteristics of the input image are changed greatly, it becomes possible to enhance the suppression effects of a back transition, while suppressing the visual effects resulting from the change in average luminance of a display screen caused by the difference in the length of the Vsup period.

In addition, in the present embodiment, the scene change detection part 1009 was described as a part that calculates the APL in one frame as a whole and detects the characteristic change of the image by using this APL. However, the detection precision of the characteristic change can be improved by dividing one screen into a plurality of regions, calculating an APL for each region, and comparing this plurality of APL between the frames respectively.

Furthermore, it may be controlled such that the voltage of Vsup is set to be higher in the frame in which the scene change detection signal SCD is in the active state than in other frames.

Moreover, an input image signal and a synchronous signal were used as an input for the scene change detection part 1009, but a line double-speed image signal (Vs) and a synchronous signal output from the line double-speed conversion part 101 may be used.

Embodiment 7

In Embodiments 1 to 6 mentioned above, the source driver 103 was driven twice as fast by doubling the speed. In other words, twice as much transfer speed as an ordinary transfer speed was necessary, and when a panel with a large number of pixels is driven, higher performance is required for transfer and signal processing.

In fact, the panel with a large number of pixels generally is designed to reduce its transfer speed by using the conventional techniques of doubling a transfer bus width to the source driver 103 or the like, and it is not desirable for the panel with a large number of pixels to simply double the clock.

Embodiment 7 of the present invention is configured to set a Vsup period, while maintaining this transfer speed as conventionally.

Figure 11:
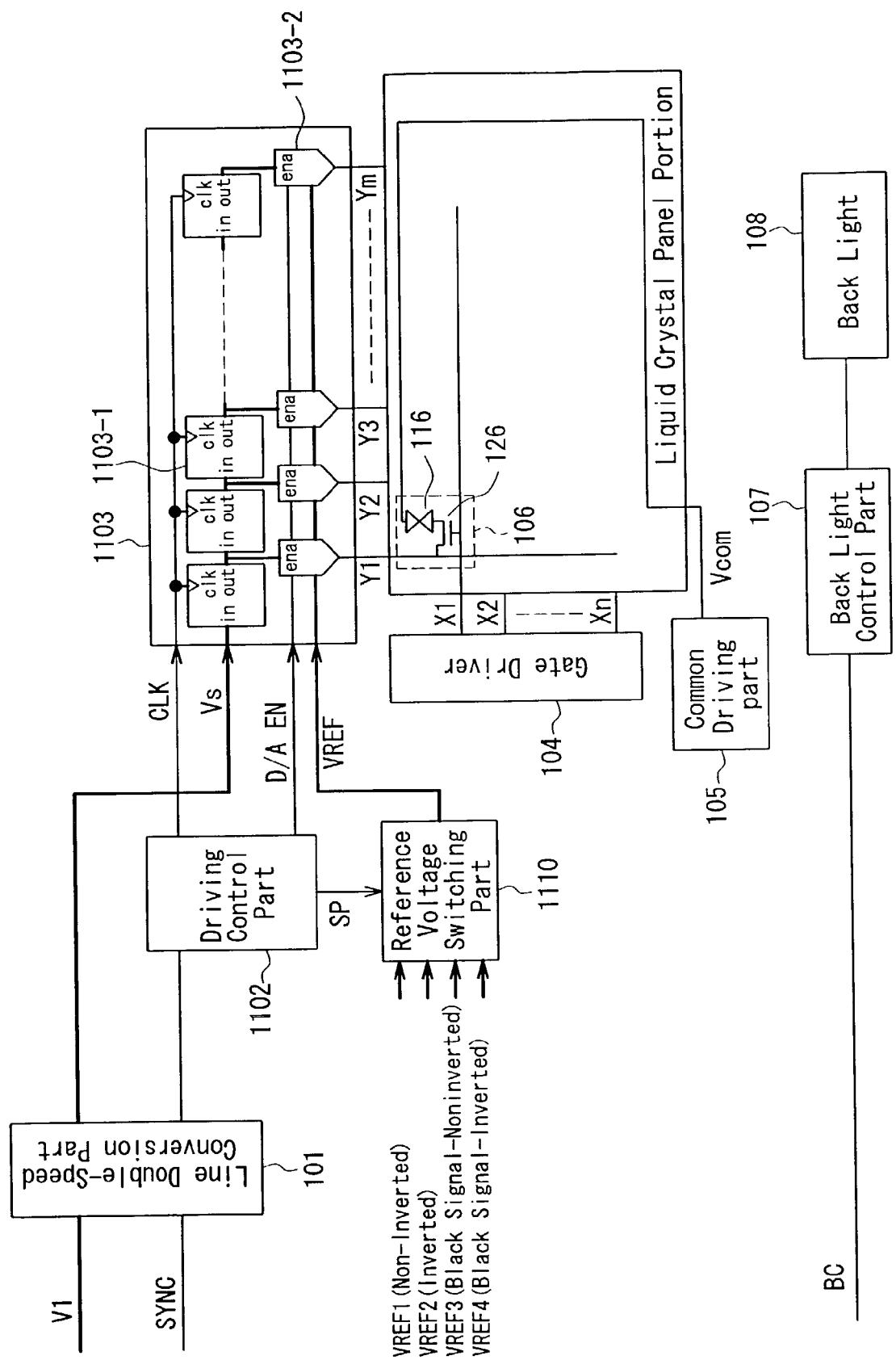
FIG. 11 is a block diagram showing the configuration of a liquid crystal display device according to Embodiment 7 of the present invention.

FIG. 11 is a block diagram showing the configuration of a liquid crystal display device according to Embodiment 7 of the present invention. In FIG. 11, the liquid crystal display device includes a line double-speed conversion part 101, a driving control part 1102, a reference voltage switching part 1110, a source driver 1103, a gate driver 104, an common driving part 105, a pixel cell 106, a back light control part 107 and a back light 108.

As shown in FIG. 11, digital data Vs that were input to the source driver 1103 are transferred to an internal shift register including a plurality of flip-flops 1103-1, and after a transfer for all the pixels is completed, a D/A enable signal (D/AEN) from the driving control part 1102 renders the D/A conversion part 1103-2 to be in an enable state. Furthermore, the driving control part 1102 outputs a switching signal (SP) to the reference voltage switching part 1110, and the reference voltage switching part 1110 selects a reference voltage VREF1 (voltage (A): black level–voltage (E): white level) serving as the input-output characteristics shown in FIG. 12A and outputs it to the D/A conversion part 1103-2. Based on the reference voltage VREF1 that was input from the reference voltage switching part 1110, the D/A conversion part 1103-2 converts it into source voltages Y1 to Ym for each pixel in which the input digital data for each pixel were subject to the gamma correction shown in FIG. 12A.

Furthermore, by switching the reference voltage VREF to a reference voltage VREF2 (voltage (A): white level–voltage (E): black level) so as to realize completely reversed input-output characteristics of FIG. 12A as shown in FIG. 12B, the so-called source inversion can be achieved.

Furthermore, by switching the reference voltage VREF to a reference voltage VREF 3 (voltage (A)–voltage (E): black level) for an initialization signal in the initialization signal write period as shown in FIG. 12C, the voltage after the D/A conversion becomes an initialization signal regardless of whatever data are transferred to the shift register inside the source driver 1103.

In addition, by switching the reference voltage VREF to a reference voltage VREF 4 (voltage (A)–voltage (E): black level) for an inverted initialization signal in the initialization signal write period as shown in FIG. 12D, the voltage after the D/A conversion becomes an inverted initialization signal regardless of whatever data are transferred to the shift register inside the source driver 1103.

As described above, according to the present embodiment, it is no longer necessary to transfer an initialization signal, and thus, both the image signal and the initialization signal can be driven to a liquid crystal cell, while maintaining the transfer speed of the source driver as conventionally.

Embodiment 8

As is disclosed, for example, in JP9(1998)-325715A, it is widely known with respect to a hold type display element such as a liquid crystal that human visual integral characteristics deteriorate the visibility of moving images.

Therefore, Embodiment 8 of the present invention is configured to provide a liquid crystal display device in which a back transition is prevented by changing a Vsup hold period depending on whether the image is a moving image or a static image, while luminance deterioration is suppressed to be a minimum in the case of a static image and the visibility of moving images is improved in the case of a moving image.

Figure 13:
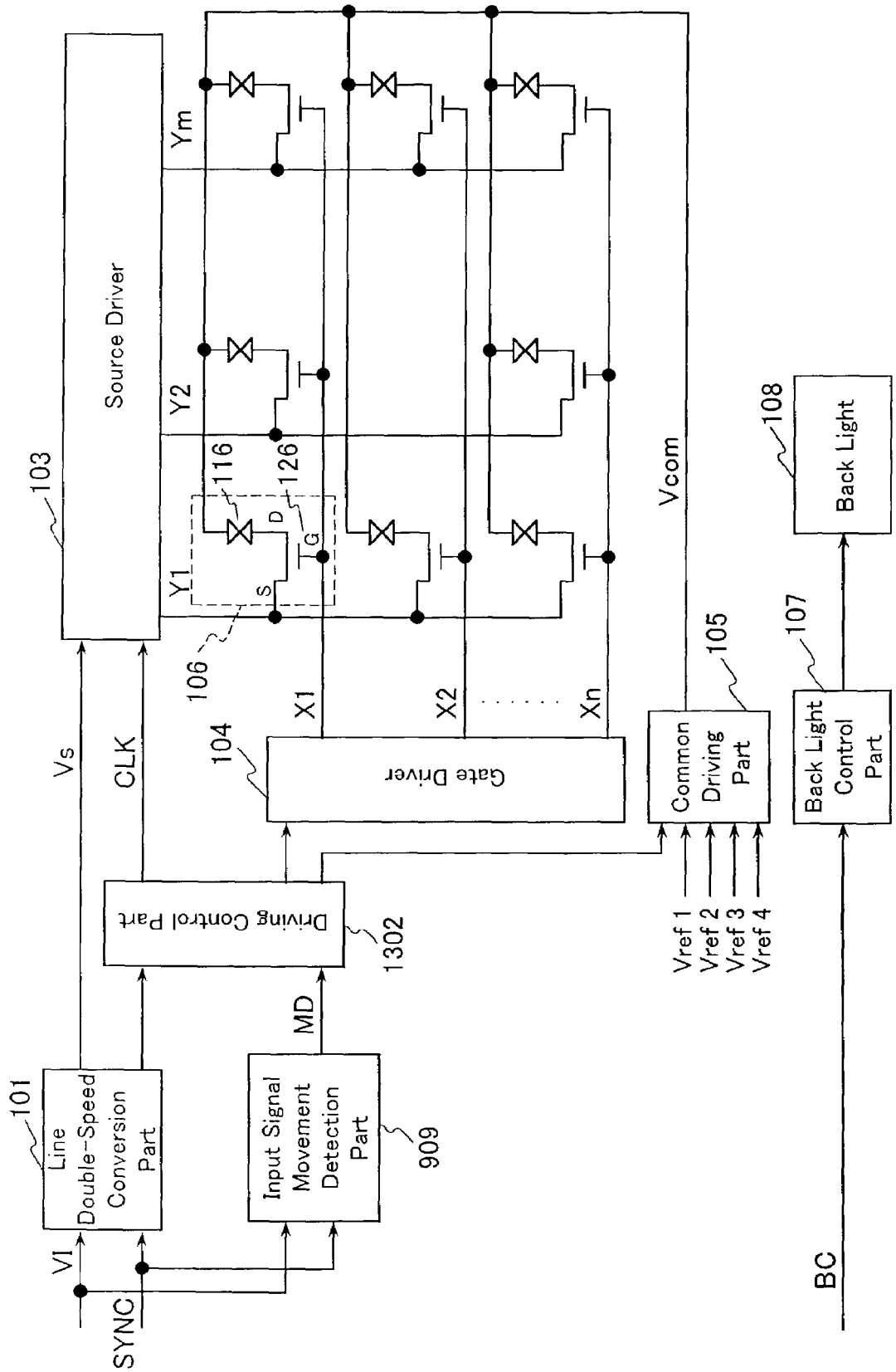
FIG. 13 is a block diagram showing the configuration of a liquid crystal display device according to Embodiment 8 of the present invention.
Figure 14:
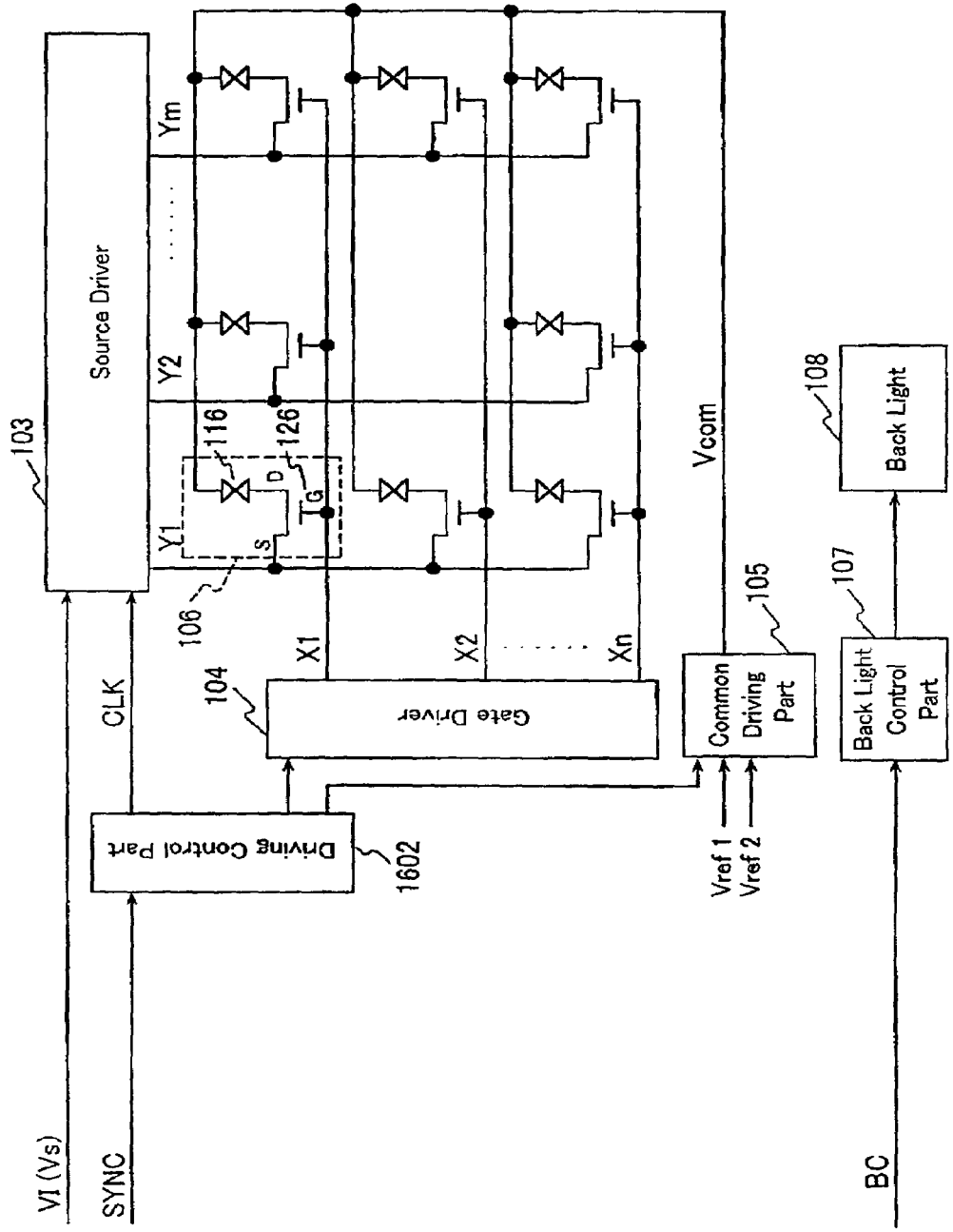
FIG. 14 is a block diagram showing the configuration of a conventional liquid crystal display device.
Figure 15:
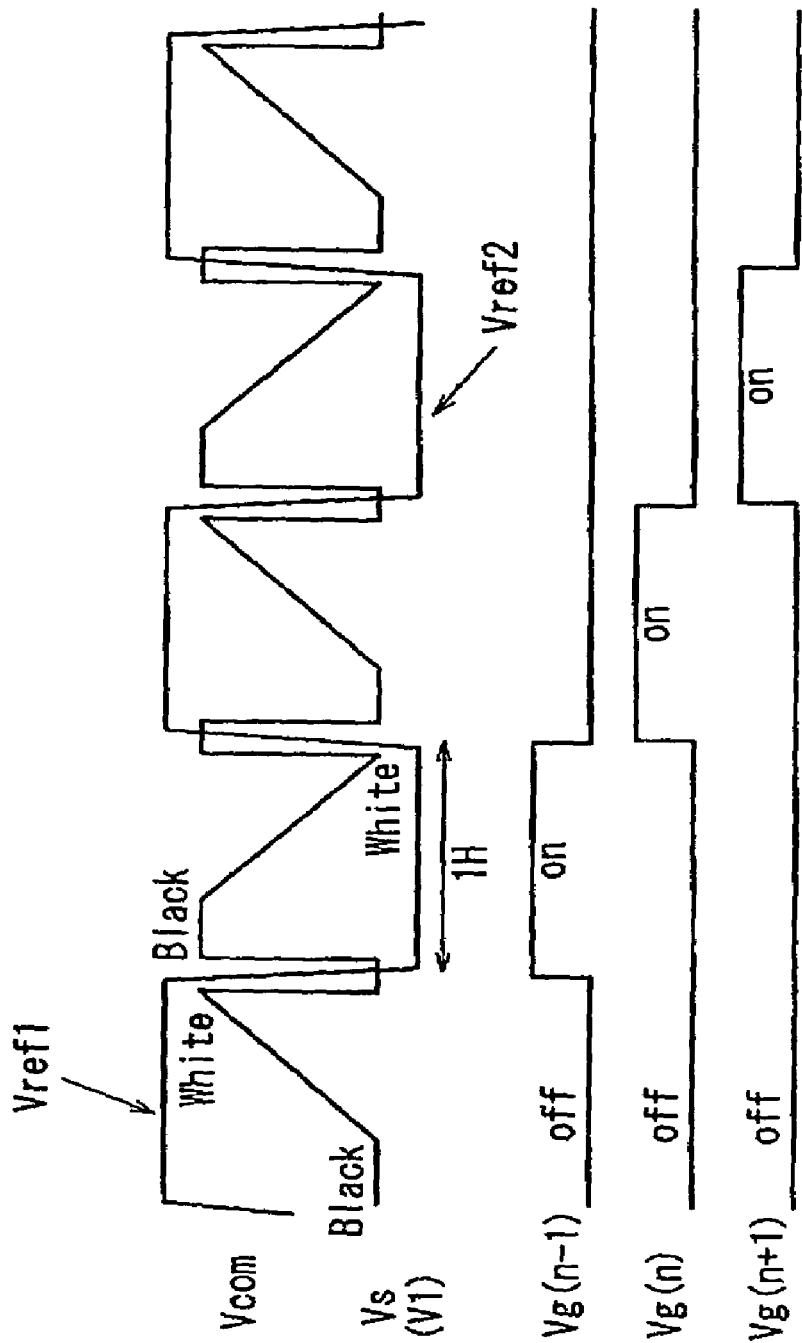
FIG. 15 is a timing chart for an common voltage Vcom, a source signal Vs and a gate signal Vg for driving the liquid crystal display device shown in FIG. 14 with respect to a given input image signal.
Figure 16:
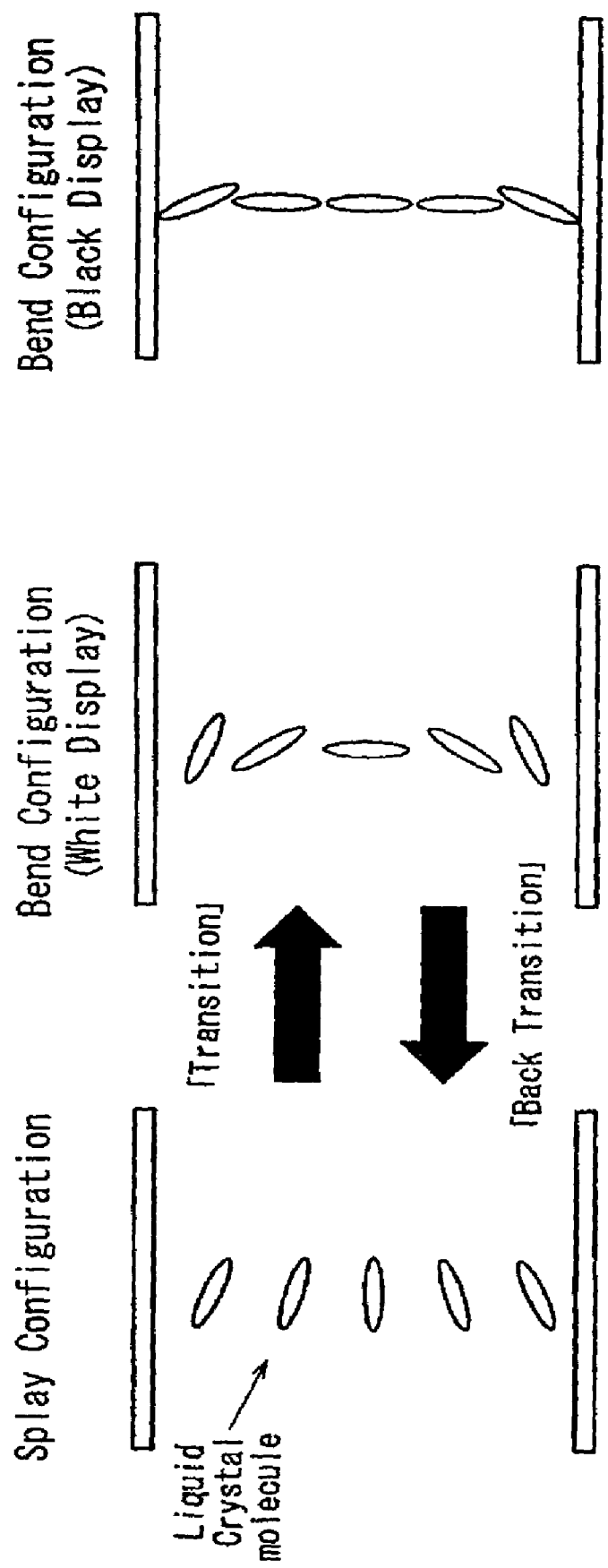
FIG. 16A is a schematic view showing an OCB cell in a splay configuration state.
FIG. 16B is a schematic view showing an OCB cell in a bend configuration (white display) state.
FIG. 16C is a schematic view showing an OCB cell is in a bend configuration (black display) state.

FIG. 13 is a block diagram showing the configuration of a liquid crystal display device according to Embodiment 8 of the present invention. In FIG. 13, the liquid crystal display device includes a line double-speed conversion part 101, a driving control part 1302, a source driver 103, a gate driver 104, an common driving part 105, a pixel cell 106, a back light control part 107, a back light 108 and an input signal movement detection part 909.

As shown in FIG. 13, it is detected in the input signal movement detection part 909 whether the input image signal is a moving image or a static image, and the driving control circuit 1302 generates a control signal such that the Vsup hold period is set longer when it is judged as a moving image, and that the Vsup hold period is set shorter when it is judged as a static image.

In addition, Embodiment 5 mentioned above is configured only for the purpose of preventing a reverse phenomenon from occurring. Therefore, it was controlled not to set the Vsup hold period or to set it shorter when it was judged that the input image signal is a moving image and to set the Vsup hold period longer when it was judged that the input image signal is a static image. However, the present embodiment is configured to perform the controlling as mentioned above both for the purpose of preventing a reverse phenomenon from occurring and improving the visibility of moving images.

As described above, according to the present embodiment, while a back transition is prevented by changing the Vsup hold period depending on whether the input image signal is a moving image or a static image, the luminance deterioration is suppressed to be a minimum in the case of a static image, and the visibility of moving images can be improved in the case of a moving image by elongating the period of an initialization signal and thus approximating it to impulse type display driving such as CRT.

As described above, according to the present invention, it becomes possible to easily set the shortest Vsup hold period and the minimum Vsup voltage suppressing an occurrence of a back transition and capable of suppressing a back transition, and to display excellent images by reducing the effects of luminance deterioration on a screen as much as possible by inserting a Vsup hold period.

The invention claimed is:

1. A method for driving a liquid crystal display device having a liquid crystal panel, the liquid crystal panel comprising a plurality of source lines to which pixel data are supplied, a plurality of gate lines to which scanning signals are supplied, pixel cells positioned in matrix form in correspondence with intersecting points of the source lines and the gate lines, a source driver that drives the source lines based on an input image signal, a gate driver that drives the gate lines, and a back light, the pixel cells being applied with a signal for initializing a state of a liquid crystal therein as well as pixel data in correspondence with the image signal in the pixel cells, wherein a first period for writing the signal for initializing a state of the pixel cells and a second period for writing the pixel data are provided in one frame period, a length of the first period is set variably for each frame, a voltage level to be applied to each pixel cell in the first period is set such that each pixel cells retains a voltage Vsup higher than a voltage level to be applied to each pixel cell in the second period, and the length of the first period is controlled by a result of calculating an average luminance level by an image signal input in a predetermined number of preceding frames and an average luminance level by an image signal to be input in a current frame.

2. The method for driving a liquid crystal display device according to claim 1, wherein when a difference between an average luminance level by an image signal input in a predetermined number of preceding frames and an average luminance level by an image signal to be input in a current frame is larger that a predetermined level, the first period is set in a predetermined length in a next frame.

3. A method for driving a liquid crystal display device having a liquid crystal panel, the liquid crystal panel comprising a plurality of source lines to which pixel data are supplied, a plurality of gate lines to which scanning signals are supplied, pixel cells positioned in matrix form in correspondence with intersecting points of the source lines and the gate lines, a source driver that drives the source lines based on an input image signal, a gate driver that drives the gate lines, and a back light, the pixel cells being applied with a signal for initializing a state of a liquid crystal therein as well as pixel data in correspondence with the image signal in the pixel cells, wherein a first period for writing the signal for initializing a state of the pixel cells and a second period for writing the pixel data are provided in one frame period, a length of the first period is set variably for each frame, a voltage level to be applied to each pixel cell in the first period is set such that each pixel cells retains a voltage Vsup higher than a voltage level to be applied to each pixel cell in the second period, and it is detected whether an input image signal is a moving image or a static image, and as a result of detection, the first period is set longer than a predetermined length when it is judged that the input image signal is a moving image, and the first period is set shorter than a predetermined length when it is judged that the input image signal is a static image.

* * * * *